United States Patent

[11] 3,618,805

[72] Inventor Oscar W. Meller
Akron, Ohio
[21] Appl. No. 54,981
[22] Filed July 15, 1970
Division of Ser. No. 808,481, Mar. 19, 1969, Pat. No. 3,563,578
[45] Patented Nov. 9, 1971
[73] Assignee Goodyear Aerospace Corporation
Akron, Ohio

[54] CARGO CONTAINER OR THE LIKE
7 Claims, 3 Drawing Figs.
[52] U.S. Cl. .................................................. 220/6,
217/16, 217/65
[51] Int. Cl. ..................................................... B65d 7/28,
B65d 7/24
[50] Field of Search ............................ 220/4 R, 6,
7; 217/12, 13, 14, 16; 287/20.927, 20.924; 52/585, 710

[56] References Cited
UNITED STATES PATENTS
2,525,838  10/1950  Smith ........................... 220/6 X
2,801,895  8/1957   Cass ............................. 287/20.927 X
2,882,564  4/1959   Couse ........................... 287/20.924 X
2,986,245  5/1961   Tuttle ........................... 217/65 X
3,405,835  10/1968  Eby .............................. 220/4 R
FOREIGN PATENTS
855,140  11/1960  Great Britain .................. 220/4 R
609,947  10/1960  Italy ............................ 220/4 R Primary Examiner—George E. Lowrance
Attorneys—J. G. Pere and L. A. Germain ABSTRACT: The invention relates to a cargo container or the like constructed of panels which have unique joints specifically adapted for quickly assembling or disassembling the container. Specifically, a unique flexible hinge arrangement is provided for vertical joints, while a quick-fitting locking arrangement is provided at all base horizontal joints. The base joint comprises a flange on the vertical member mating with a recessed beveled groove on the base member, and a plurality of screws threadably received in the flange of the vertical member having tapered heads slidably received in the beveled groove of the base member whereby when the screws are tightened, they lock into the groove of the base member and secure the vertical member to the base member.

INVENTOR
OSCAR W. MELLER

BY
Oldham & Oldham
ATTORNEYS

CARGO CONTAINER OR THE LIKE

This application is a division of my copending application Ser. No. 808,481, filed Mar. 19, 1969 now U.S. Pat. No. 3,563,578 issued Feb. 16, 1971.

Heretofore, it has been known that quickly assembled and disassembled panels for construction purposes are highly desirable to give flexibility, fast construction, and secured joints to preformed panels for cargo containers, building construction and the like. Many and varied attempts have been made to provide such joints for module like construction, and the patents which have been granted in this field are numerous. However, improvements in this field are still needed to provide great flexibility, and the ability to assemble and disassemble quickly for storage and transportation purposes.

Therefore, it is the general object of the invention to provide a module construction designed primarily for a cargo container which provides a unique interrelation of the panels by allowing great flexibility and quick assembly of vertical joints, as well as horizontal joints, and where the panels stack disassembled in less than one-tenth the space they take when assembled.

A further object of the invention is to provide a unique joint construction between the vertical members comprising the module and the base members which allows quick assembly and disassembly, a secured joint, and great flexibility in the positioning of vertical members with respect to the base.

The aforesaid objects of the invention and other objects which will become apparent as the description proceeds are achieved by providing a joint for module construction which comprises a pair of members to be joined, a first flange attached to and extending along the edge of one member, said flange having at least one long relatively flat exposed surface, a second flange attached to and extending along the edge of the other member and having a beveled recessed groove extending therealong, and screw means having enlarged tapered heads threadably received through the flat surface of the first flange with the heads slidably received in the groove of the second flange, and where each screw means has a shank adapted to be turned to lock the head in fixed relation to the groove and secure the members together.

For a better understanding of the invention reference should be had to the accompanying drawings wherein.

Figure 1:
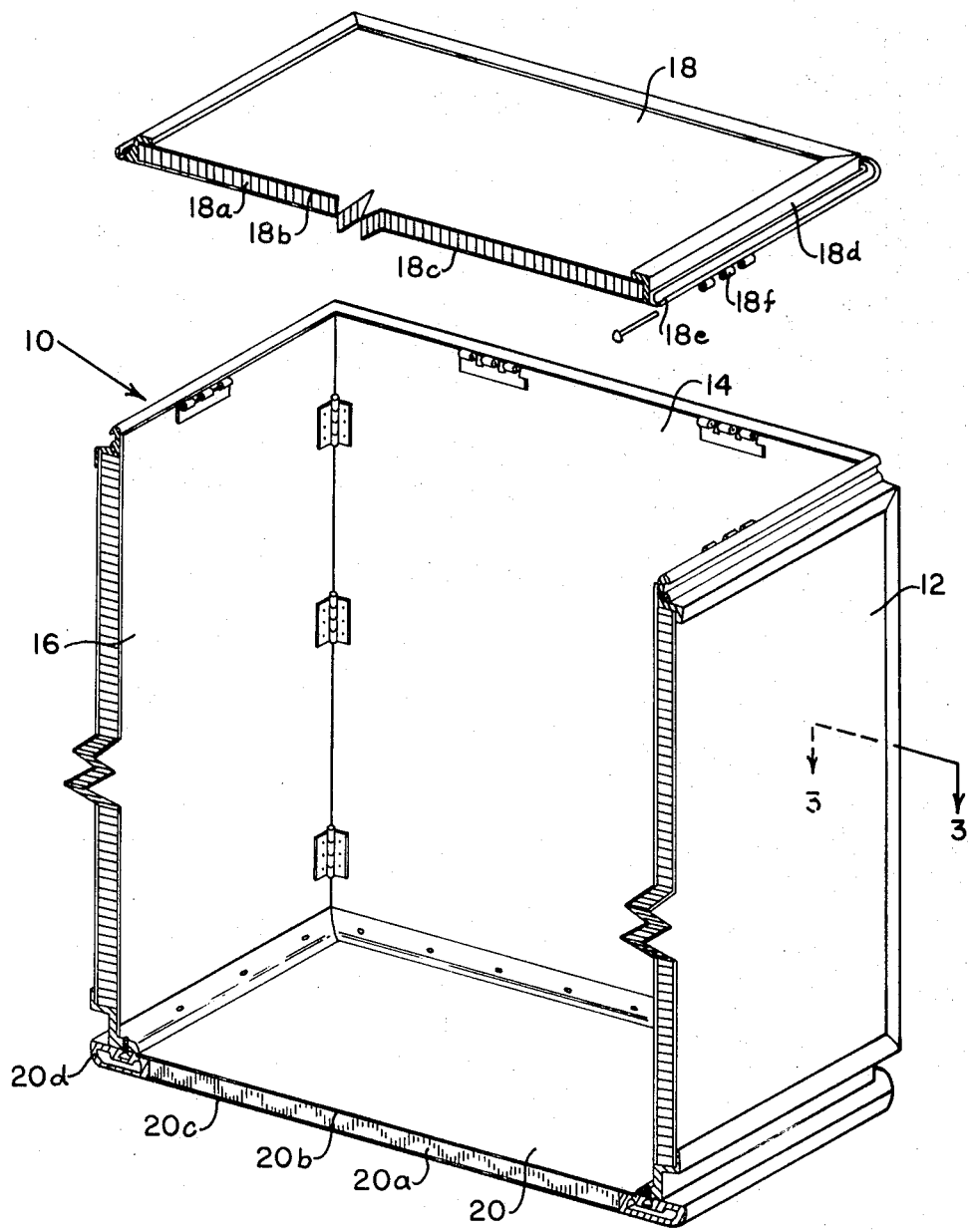
FIG. 1 is an exploded perspective cross-sectional view of the cargo container incorporating the construction comprising a preferred embodiment of the invention.

With reference to the form of the invention illustrated in the drawings, the numeral 10 indicates generally a cargo container comprising side panels 12, 14, and 16 which associate with a top panel 18 and a base panel 20. In the preferred embodiment of the invention, where the container is utilized as a cargo container for aircraft, for example, each of the panels 12 through 18 is preferably made with a honeycomb core, as seen at 18a in top panel 18 covered by metallic inner and outer skins 18b and 18c, respectively. A frame 18d normally made of extruded aluminum is provided around the edges of the panel 18, as illustrated and terminates in a lower flange 18e carrying hinges 18f. Each of the respective side panels 12, 14, and 16 are made of substantially the same construction to provide a lightweight, high-strength panel.

The essence of the invention, however, relates to the attachment of the side panels to the base 20. The base panel, because the structure is designed as a cargo container, is principally designed to be a cargo pallet, and hence normally will not have a honeycomb core, but rather some core of greater structural strength, such as a balsa wood core, as indicated by numeral 20a. Again, however, the core 20a will be covered by appropriate metal skin sheets 20b and 20c, respectively, and have some type of extruded aluminum frame 20d extending therearound.

Figure 2:
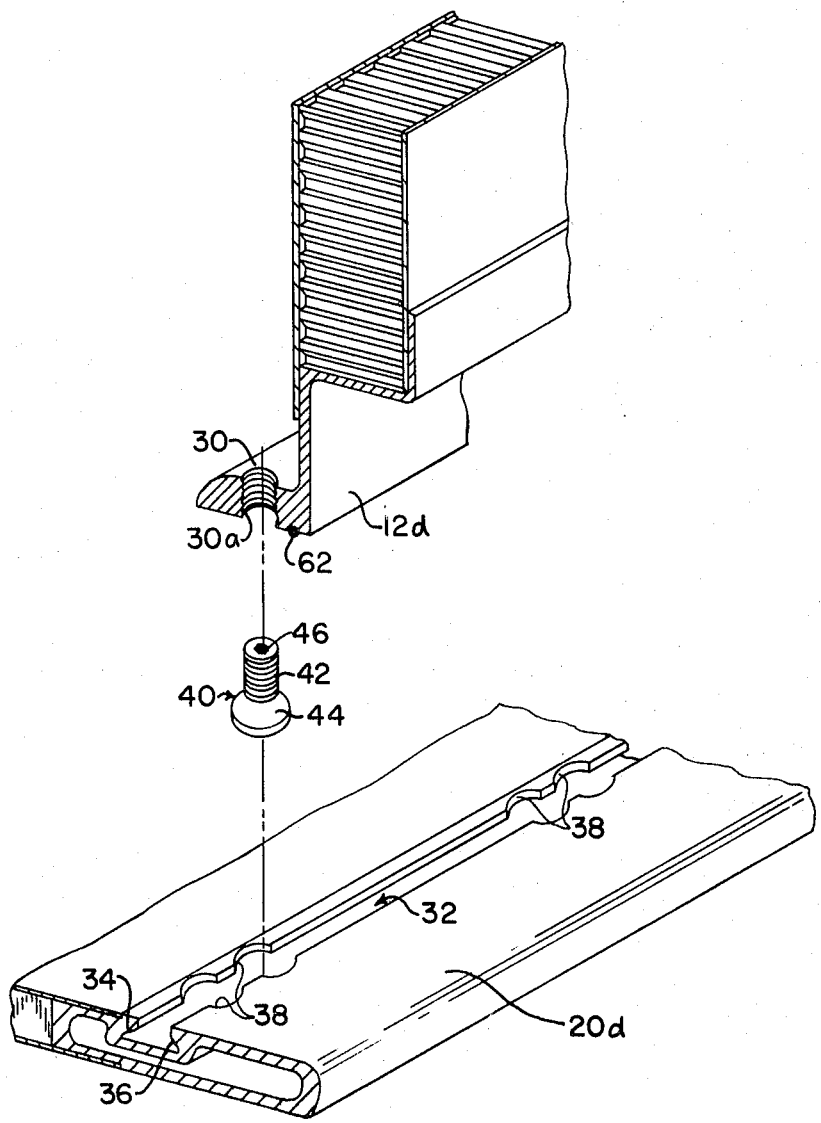
FIG. 2 is an enlarged exploded perspective view of the panel joint between the vertical panels and the base panels.

With respect to the attachment of the side panel 12 to bottom panel 20, attention is directed to FIG. 2 of the drawing which illustrates that panel 12 has the bottom edge of its frame 12d formed to a flat flange 30 which lies essentially horizontally, and this flange cooperates with a recessed beveled groove indicated generally by numeral 32 in the upper surface of frame 20d of base panel 20. The groove 32 is beveled along each of its side edges at 34 and 36, respectively, at an angle of between 15° to 60°, but preferably about 20°, and is of uniform bevel along its length. In order to attach the flange 30 to the groove 32, the invention utilizes a screw, indicated generally by numeral 40, which comprises a threaded shank portion 42 and an enlarged tapered head 44. The angle of the taper on head 44 is complementary to the angle on the beveled groove 32. The head 44 is slidably received in groove 32 with its taper mating with the surfaces 34 and 36, respectively. In order to provide relative movement between the flange 30 and the frame 20d, a threaded hole 30a is provided in the flange to receive the threaded shank 42 of screw 40. Similarly, in order to position the head 44 of screw 40 into the groove 32, appropriate enlarged circular openings 38 centrally positioned in the groove are cut therein. The invention normally contemplates that only a single opening 38 will be necessary for each screw 40, but for the purposes of utilizing the bottom panel 20 as a cargo pallet, and to incorporate attachment of normal cargo holddown members to the pallet, the double or side-by-side hole relationship 38 shown in the frame 20d of FIG. 2 is preferably utilized.

In order to turn the shank 42 threadably received into hole 30a of flange 30, a multisided opening 46, preferably such to fit a conventional Allan setscrew wrench is provided. Hence, when the shank 42 is initially started into the hole 30a with the head 44 then positioned down through a respective hole 38, the shank may then be screwed up through hole 38 to draw flange 30 into flush engagement with the top of frame 20d. This provides a quick assembly as a tight and secure panel joint is achieved between the side panel 12 and the base panel 20.

Normally the invention contemplates that the spacing of the screws 40 will be dependent upon the required loading characteristics of the container formed in accordance with the concept of the invention. Hence, for greater loading requirements, the screw spacing will be closer, than for lesser loading requirements. At the present time, for normal aircraft cargo container requirements, the desirable screw spacing is between 8 to 12 inches, although spacing down to as little as 2 to 3 inches is readily feasible where high loading requirements are necessary in the construction.

It should be understood that one of the important features of the invention is to allow the top and side panels to be readily broken down for storage in a flat condition in combination with the base panel so that an aircraft might readily transport a great many more containers in the broken-down condition than in the assembled condition when transportation without carrying is necessary. With the hinged side panel construction, the hinged top panel construction, and the ready panel joint formed between the flange 30 of each side panel and the base frame 20d of the base panel 20 as shown in FIG. 2, disassembly between the top, side and base panels is expediously accomplished.

Figure 3:
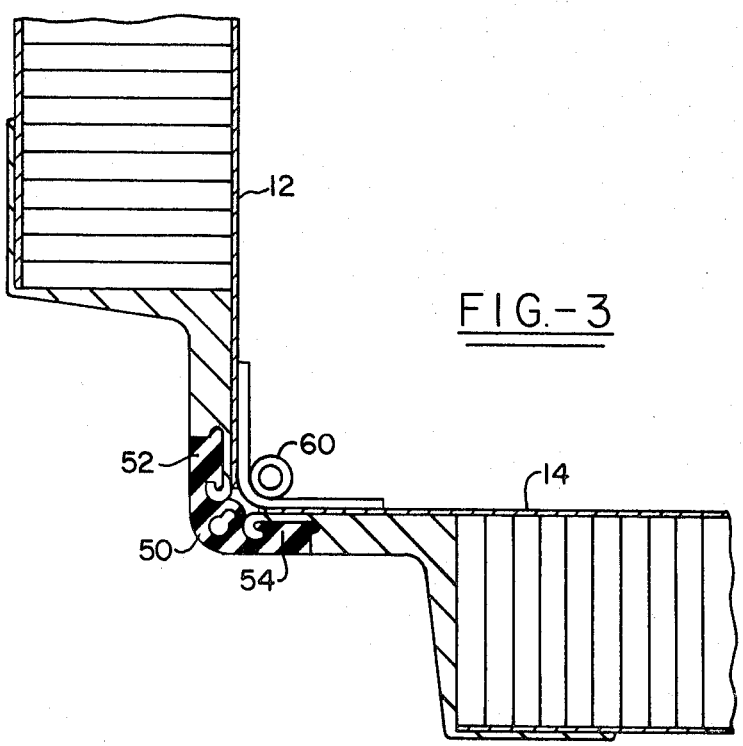
FIG. 3 is an enlarged broken-away horizontal cross-sectional view of the joint between vertical panels, as taken on line 3—3 of FIG. 1.

One other feature of the invention is shown in FIG. 3 of the drawings which illustrates a flexible rubber gasket 50 interlocked in receiving grooves 52 and 54 of side panels 12 and 14, respectively. The flexible gasket 50 provides a watertight seal between such side panels, and yet still allows the side panels to take any angle with respect to each other, if a 90° angular relationship therebetween is not desired in some instances. Also, the gasket 50 works well in conjunction with the hinges indicated generally by numeral 60 which attach the side panels with respect to each other. A similar gasket 50 is used between the side and top panels, also, while a small flexible rubber or plastic tube 62, as best seen in FIG. 2 of the drawings extends in a recessed groove along the bottom face of flange 30 so as to provide a watertight-sealed engagement between the respective side panel and bottom panel when they are appropriately positioned together with screw fittings 40, as described with respect to FIG. 2 above.

Thus, it is seen that the objects of the invention have been achieved by providing quick assembly and disassembly plus interchangeability of containers or shelter components for knockdown shipment and field assembly.

ASSEMBLY SEQUENCE

To assemble the structure described above, the proper number of screw fittings 40 will be appropriately screwed into their respective hole 30a in the side panels engaging sufficient threads to prevent the fitting from dropping out of the panel. This is repeated for each fitting location in the panel. Then the tapered heads are placed in the circular openings 38 in the frame 20d, and slidably moved forward approximately one-half inch so that the tapered head 44 falls effectively between the pairs of openings 38. This procedure is repeated for each of the remaining panels until the corner hinges 60 are aligned. The hinge pins are then placed in each hinge for a structural tie between the panels. The top panel 18 is then positioned on the end and side panels so that the hinges which also connect the top to the end and side panels are aligned, with the hinge pins then inserted thereinto. The gaskets 50 are then placed in position between respective side panels and the top panel with the final step being a tightening of the screw fittings 40 to predetermined final torque readings by inserting a standard internal wrenching tool in recessed internal wrenching opening 46 in the fitting 40.

The screws 40 permit longitudinal adjustment of the side panels with respect to the base frame 20d thereby making it possible to adjust the panels for the installation of the hinge connector pins in the corners. The screws 40 in addition to providing the structural tie between side panels and the base panel provides the compressive force to deflect the bottom seal tube 62 sufficiently to effect a watertight base seal. And further, as pointed out above, the groove 32 with pair of holes 38 allows the use of standard cargo net tiedown fittings. The approximate knockdown or nested container ratio is 10 to 1 of a completely assembled container, and this permits containers to be shipped or transported in a knockdown condition thereby conserving cargo volume when containers are shipped or returned empty. Also, since similar parts are interchangeable, downtime for repair or replacement is held to an absolute minimum.

While in accordance with the patent statutes only the best known embodiment of the invention has been illustrated and described in detail, it is to be particularly understood that the invention is not limited thereto or thereby, but that the inventive scope is defined in the appended claims.

What is claimed is:

1. A cargo container construction which comprises four vertical side members and a top member and a base member to be joined, a first flange attached to and extending along the bottom edge of each side member, said flange having at least one long relatively flat exposed surface, a second flange attached to and extending along the edge of the bottom member in complimentary position to the flange of each respective side member, and having a beveled recessed groove extending therealong, screw means having large tapered heads threadably received through the flat surface of the first flange of each side member with the heads slidably received in mating relationship in the respective groove of the second flange, and where each screw member has a shank adapted to be turned by access through the flange to lock the head in fixed relation to the groove and secure the side members to the base member, and hinge means to connect the vertical mating edges of the side members and the horizontal mating edges of the side members to the top member.

2. The cargo container construction according to claim 1 wherein the groove has enlarged openings at spaced intervals separated from one another by substantially the distance between adjacent screw means of the side panels, the openings permitting the heads of the screw means to be inserted into the beveled groove.

3. The cargo container construction according to claim 1 including flexible gasket means in sealing relation between each of the side members, between the side members and the top member, and between the side members and the base member.

4. A container which may be disassembled into flat panels, comprising:
a base panel having a flange extending along the edges thereof, the flange having a beveled recessed groove extending therealong;
side panels each having a flange on its lower edge adapted to overlie the flange of the base panel and releasable interconnecting means for joining the mating vertical edges of the side panels;
a plurality of screw means threaded into the flanges of the side panels and having large tapered heads slideably received in mating relationship in the respective groove of the base panel flange; and
a top panel having means for releasably connecting the top panel to the top edges of the side panels.

5. The container according to claim 4 wherein each screw means has a shank adapted to be turned by access through the flange of the side panel to lock the head in fixed relation in the groove, securing the side panels to the base panel.

6. The container according to claim 4 wherein the base panel has a balsa wood core and wherein the other panels have honeycomb cores.

7. The container according to claim 4 wherein the connecting means between adjacent side panels and between the side panel and the top panel comprise hinge means.

* * * * *